(12) United States Patent
Liu et al.

(10) Patent No.: US 6,880,553 B2
(45) Date of Patent: Apr. 19, 2005

(54) SOLAR AIR CONDITIONING SYSTEM

(75) Inventors: Tay-Jian Liu, TaoYuan Hsien (TW); Chien-Hsiung Lee, TaoYuan Hsien (TW)

(73) Assignee: Atomic Energy Council-Institute of Nuclear Energy

( * ) Notice: Subject to any disclaimer, the term of this patent is extended or adjusted under 35 U.S.C. 154(b) by 0 days.

(21) Appl. No.: 10/445,460

(22) Filed: May 27, 2003

(65) Prior Publication Data

US 2004/0237960 A1 Dec. 2, 2004

(51) Int. Cl.$^7$ ............................................. E04D 13/18
(52) U.S. Cl. ....................... 126/628; 126/658; 126/705
(58) Field of Search ................................. 126/628, 658, 126/705, 709, 621, 627

(56) References Cited

U.S. PATENT DOCUMENTS

| | | | |
|---|---|---|---|
| 4,182,308 A | * | 1/1980 | Reynolds ..................... 126/640 |
| 4,219,011 A | * | 8/1980 | Knoos ......................... 126/666 |
| 4,282,862 A | * | 8/1981 | Soleau ......................... 126/687 |
| 4,286,576 A | * | 9/1981 | McClelland ................. 126/617 |
| 4,454,863 A | * | 6/1984 | Brown et al. ................ 126/669 |
| 5,259,363 A | * | 11/1993 | Peacock et al. ............. 126/621 |
| 5,596,981 A | * | 1/1997 | Soucy ......................... 126/704 |

* cited by examiner

Primary Examiner—Alfred Basichas
(74) Attorney, Agent, or Firm—Ladas & Parry LLP

(57) ABSTRACT

This invention provides buildings with a modular air conditioning system that utilizes solar energy for heating air. This invention contains a solar collector assembly, an inlet assembly and an outlet assembly. The solar collector assembly further comprises a transparent panel, a heat-absorbing set and a support base, and forms paths for heating the air, wherein the heat-absorbing set is made of several simple, light-weight modular heat-absorbing units to form several heat-absorbing channels. Such a design not only can fully utilize the heat-absorbing space on the roof and save the cost for being displayed in marketing channels, but also can be constructed by the users in accordance with their own needs, so as to save cost in modularization. The inlet and outlet assemblies communicate to the heat-absorbing channels in the solar collector assembly and are respectively connected to the pipes and paths leading into and out of the buildings. By switching and adjusting the openings of these pipes and paths, in winter, the preheated air will be introduced into buildings; and in summer, the hot indoor air will be expelled out of the buildings and fresh air will be guided into the buildings. As a result, a more economical air conditioning system is formed.

20 Claims, 6 Drawing Sheets

SOLAR AIR CONDITIONING SYSTEM

BACKGROUND OF THE INVENTION

1. Field of the Invention

The present invention relates to an energy-saving solar air conditioning system for buildings. Particularly, the present invention relates to an energy-saving air conditioning system by which, in winter, the preheated air will be introduced into buildings; and in summer, the hot indoor air will be expelled out of the buildings and fresh air will be guided into the buildings.

2. Description of the Related Art

With increasing $CO_2$ emissions, the global climate has become abnormal and ecological destruction has increased greatly. As a result, industrialized countries have again become aware of the urgency to reduce their dependence on fossil fuels after the energy crisis in the 70's. Consequently, these countries have given positive comments on how to use solar energy more effectively. Though the technology field still has reservations about whether solar energy will be able to replace other energy resources in the near future, one thing that is almost certain is that solar energy will be playing a very important role in a number of fields, especially those related to domestic heating and air ventilation.

As far as an air conditioning system using solar energy for domestic heating and air ventilation is concerned, a solar collector is the key device for the system, and it has to be mounted at an outdoor location where sufficient sunlight can be collected, such as on a roof or wall. In the past, a lot of effort has been made in developing solar collectors with different functions and styles. Many of them have been disclosed in patent literature. The most typical example is glazing a glass panel or transparent panel onto a fixed outer frame of a heat-insulated chamber and passing fluid through black heat-absorbing plates or pipes installed inside the chamber, so as to absorb the solar energy. Examples include the solar hot water supply system disclosed in U.S. Pat. No. 4,418,685, the air ventilation facility disclosed in WO9,625,632, the roof-style air ventilation facility disclosed in US2002/0,032,000A1, and the wall-style air preheater disclosed in U.S. Pat. No. 4,934,338. However, the solar collectors used presently still have some drawbacks. Therefore, there is much room for improvements in applying and promoting the usage of solar energy to save energy and facilitate air conditioning in buildings. The aforementioned drawbacks include:

(1) The conventional solar collector is too heavy. Its long-term use may cause a load to some buildings.

(2) The structure of the conventional solar collector is complicated, which makes its installation and maintenance difficult. Moreover, it increases the costs and thus prolongs the return period.

(3) The conventional solar heating device has poor compatibility and flexibility to match every type of buildings. Very often, it has to be custom-made.

(4) The contour of the solar collector is obtrusive and often impairs the aesthete and harmony of the overall appearance of the buildings.

(5) The package of the collector takes up much space and increases the costs for storage, commodity display, and channel marketing.

(6) The integral assembly of the whole-unit product is bulky, making it difficult for the application on a large area and increases installation cost.

(7) Glass or transparent panels are glazed onto the outer frame of a heat-insulated chamber. Different thermal expansion coefficients of materials may cause thermal stress problems.

(8) The conventional design cannot satisfy clients' senses of participation and achievement by self-installing the collectors.

(9) Some of the conventional designs can only be applicable to the buildings which are under construction and well-planned for its installation. For most existing buildings, the designs are unsuitable.

(10) When air passes over a glazed panel, heat is dissipated unless a double-glazing is used, but it is expensive and troublesome.

(11) Hot water supply systems or liquid systems operated by solar heating have the problems due to potential of freezing and leakage which impede to reach the expected performance.

BRIEF SUMMARY OF THE INVENTION

To overcome the above drawbacks, the present invention provides a simple, inexpensive, compact and elegant air conditioning system which has a high efficiency of heat-absorption and is a modular arrangement. This system is directed to a passive energy-saving air conditioning system which is driven by solar energy and thus is environmental friendly. The present invention can flexibly provide different numbers of heat-absorbing units according to the air conditioning capacity of different buildings, such that, in summer time, the used air can be expelled outdoors and fresh air can be introduced indoors; and in winter time, the pre-heated air can be provided indoors so as to create a better indoor air quality. Moreover, since the present system is a highly reliable modular design, it provides the ease of displaying and convenience of delivering via marketing channels. In addition, the simple structure and the lightweight components of the present invention allow users to assemble and install the system by themselves as DIY has become a trend for home appliances.

The present invention provides buildings with a novel modular air conditioning system that utilizes solar power for heating air. Such a system is connected to indoor exhaust pipes, indoor inlet pipes, and the paths that communicate to the outdoors. The system mainly contains a solar collector assembly, an inlet assembly and an outlet assembly, which are respectively described in details as follows:

(1) Solar Collector Assembly

A solar collector assembly, used as an air heating path, is comprised of a heat-absorbing set, a transparent top panel, and a fixed support base. The heat-absorbing set is made of a plurality of modular heat-absorbing units. A configuration of the unit can be a fixed component that consists of two pieces of support boards and a piece of heat-absorbing plate. By forming an elongated groove on either both ends or the same end of the two support boards, the support boards can engage with the corresponding positioning grooves formed on the heat-absorbing plate. Then, the heat-absorbing unit with two support boards and a heat-absorbing plate is established. The heat-absorbing plate can use aluminum material which has received an anodic treatment such that the surface thereof is black. As to the top and bottom support boards, the material used therefor can be of the same material as the heat-absorbing plate or other materials.

The present invention positions several adjoining modular heat-absorbing units on a roof to form a heat-absorbing set with a plurality of heating channels. The black heat-absorbing set can greatly enhance the absorption rate of solar radiation. The increase in temperature of the heat-absorbing set directly improves the efficiency in heating air. In addition, this solar collector assembly can be installed horizontally or obliquely, or vertically attached to walls. Compared with the conventional solar collector, the modular heat-absorbing unit in accordance with the present invention can save packaging costs and the space required for storage and display. Moreover, the present invention can be distributed easily through marketing channels and assembled on site. Further, the arrangement of the modular heat-absorbing units can be adjusted and installed to meet the needs of different users. The present invention has a simple structure and light-weight, making it highly compatible to different styles of roofs. In addition, it can be used on large areas to collect solar energy. Finally, lower price and thinner overall appearance of the present invention permits great aesthetic improvements.

The transparent panel is disposed above the heat-absorbing set. Such a panel is used to enhance the green house effect of the solar collector assembly and then facilitate the collection of solar radiation and the heating-up of the heat-absorbing units. Air can be heated when it passes through the heating channels formed in the heat-absorbing set. The present invention can be better used on large areas to collect solar energy. Since it requires no conventional heat-insulated chamber with a fixed outer frame, there is no need to glaze the transparent panel on the top of the conventional heat-insulated chamber. The transparent panel used in the present invention is mounted on the top of the support boards of the heat-absorbing set and is secured to a support base of the solar collector assembly by screws. This transparent panel can be in the form of a corrugated plate or a flat plate. In addition to glass, the material of the panel can be glass fiber, plastics or other commercially available weatherproof transparent materials that can be easily acquired and size-adjusted. The absence of glazing the transparent panel onto the conventional heat-insulated chamber with a fixed outer frame prevents the panel from deformation or damage problems related to thermal stress caused by the difference in thermal expansion coefficients between them.

The support base of the solar collector assembly can be a roof or fixed boards installed additionally on the roof or wall for securing and supporting the solar collector assembly and serving as the base thereof. Beneath the heat-absorbing set, a heat-insulated layer can be added to protect the roof from over-heating. This allows air flow through the multiple lower heat-absorbing channels formed between the heat-absorbing plates and the heat-insulated layer above the support base, and through the multiple upper heat-absorbing channels formed between the heat-absorbing plates and the transparent panel to be heated up with the increase of heating efficiency.

Besides closing the entrances and exits of the multiple upper heat-absorbing channels, the adjustment of the height ratio of the support boards above and below the heat-absorbing plates, which allows more air to go through the lower heat-absorbing channels to be heated up, can also prevent the loss of heat through the transparent panel. Therefore, although the present invention has only one transparent panel, because most of the air flows through the lower heat-absorbing channels, the system demonstrates the same heat insulation effect as that of a double-glazing system. This improves the heating efficiency. When the temperature of air passing through these heat-absorbing channels becomes higher, the density of the air becomes lower than the indoor air density, which causes stronger thermal buoyancy. The resulting thermal buoyancy will lead hot indoor air to flow up and be expelled. Consequently, a comfortable living environment with better indoor air circulation will be created.

(2) Inlet and Outlet Assemblies

The inlet assembly connects to the indoor exhaust pipes and the paths communicating to the outdoors. The outlet assembly connects to indoor inlet pipes and the paths communicating to the outdoors. The sizes of the cross section of the paths are determined by the size of the solar collector assembly. Both inlet and outlet assemblies have structures that communicate to all heat-absorbing channels in the solar collector assembly, and have at least one modular ventilation damper assembly for opening and closing the paths communicating to the outdoors. The ventilation damper assemblies are mounted to the inlet and outlet assemblies by fixing the flanges thereof to the pre-set openings formed on the inlet and outlet assemblies. The difference between the inlet assembly and the outlet assembly lies in the directions of the openings thereof, wherein the pre-set openings formed on the inlet assembly are located oppositely to the heat-absorbing channels, whereas the pre-set openings formed on the outlet assembly face upwards. In order to prevent rain from getting into the ventilation damper assemblies mounted on the upward openings of the outlet assembly, a transparent canopy can be added above the outlet assembly.

In addition, toward the direction of the heat-absorbing channels, both the inlet and outlet assemblies have a blank side for connecting to the transparent panel of two ends of the solar collector assembly. Once the panel connects with the sides, the connections should be sealed. As to the inlet and outlet assemblies, they are fixed to the roof or other fixed boards. An air distributor is respectively located at the joints where the inlet assembly connects to the indoor exhaust pipes and the joints where the outlet assembly connects to the indoor inlet pipes. On such distributors, drilled holes are arranged uniformly on the side facing the heat-absorbing channels. The function of these holes is to evenly distribute air flow into each heat-absorbing channel in order to increase the overall heat-absorbing efficiency of the entire system. By switching and adjusting the openings of indoor pipes and the paths communicating to the outdoors, the heated air can be fanned indoors for heating purposes during wintertime or in cold weather, while during summertime or in hot weather, the air that goes to the indoor exhaust pipes can be heated and expelled outdoors due to the chimney effect caused by thermal buoyancy and the outdoor air from cold locations can be further introduced into the buildings to achieve the effect of air conditioning with cooled air circulation.

The aforementioned simple and reliable modular ventilation damper assemblies are located on the pre-set openings of the inlet assembly and the outlet assembly. By opening or closing the ventilation damper assemblies, the system can communicate to or be isolated from the outdoor environment. The basic structure of the ventilation damper assembly has multiple blades which are supported on both sides of an outer frame by means of parallel pivots. Each pivot is positioned on a shaft bearing clamped on the outer frame and a fastener is used to lock the bearing. Thus, when being moved to a closed position, the blades will tightly overlap each other and both sides of the outer frame to become sealed up. The operation of the ventilation damper assembly is done with a connecting rod that connects to the blades so that the turning angle of each blade is same. A pulling rod is further secured to one of the blades at a position along the line of pivots. By changing the position of the pulling rod, the blades can be turned from a completely open position to a completely closed position, and the open state of the ventilation damper assembly can be determined. Since the present invention of solar air conditioning system may be installed on roofs or high walls where most people cannot reach, such a pulling rod can be linked to a driving mechanism, such as a rope linking with the pulling rod and passing over a pulley, so that changing the blade position can be achieved by operating the rope.

Another advantage of this system is that the temperature of the heat-absorbing set can be automatically adjusted in accordance with the weather conditions. For example, in the scorching summer, when the outdoor temperature is very high, the required indoor air change rate will be the maximum, which maximizes the introduction of the cooled air into the buildings. Then, during winter when the required outdoor temperature is usually very low, the indoor air change rate will be the minimum, which minimizes the introduction of the cooled air into the buildings. Moreover, a high adjustability of air circulation is achieved by the easy controllability of the dampers located at an inlet gate (usually close to the floor) and an exhaust gate (usually close to the ceiling) and allows the indoor air change rate to be customized for a comfortable living environment.

The solar air conditioning system in accordance with the present invention can also be installed to the flat roof of steel-reinforced concrete (SRC) buildings. A better installation method is to fix this system on fixed boards. The boards can be firmly supported by iron frames with clearances between boards and the roof, while facing the sun. The sun-blocking effect caused by the present system will lower the roof temperature and the reduction of heat accumulated on the roof will be directly helpful for the buildings to save energy. In addition, this extra layer of protection on the roof means that the roof will not need too much work in respect to heat insulation.

The structure and objectives of the present invention can be more readily understood by persons skilled in the art from the following description of the preferred embodiments taken in conjunction with the accompanying drawings.

DETAILED DESCRIPTION OF THE INVENTION

Figure 1:
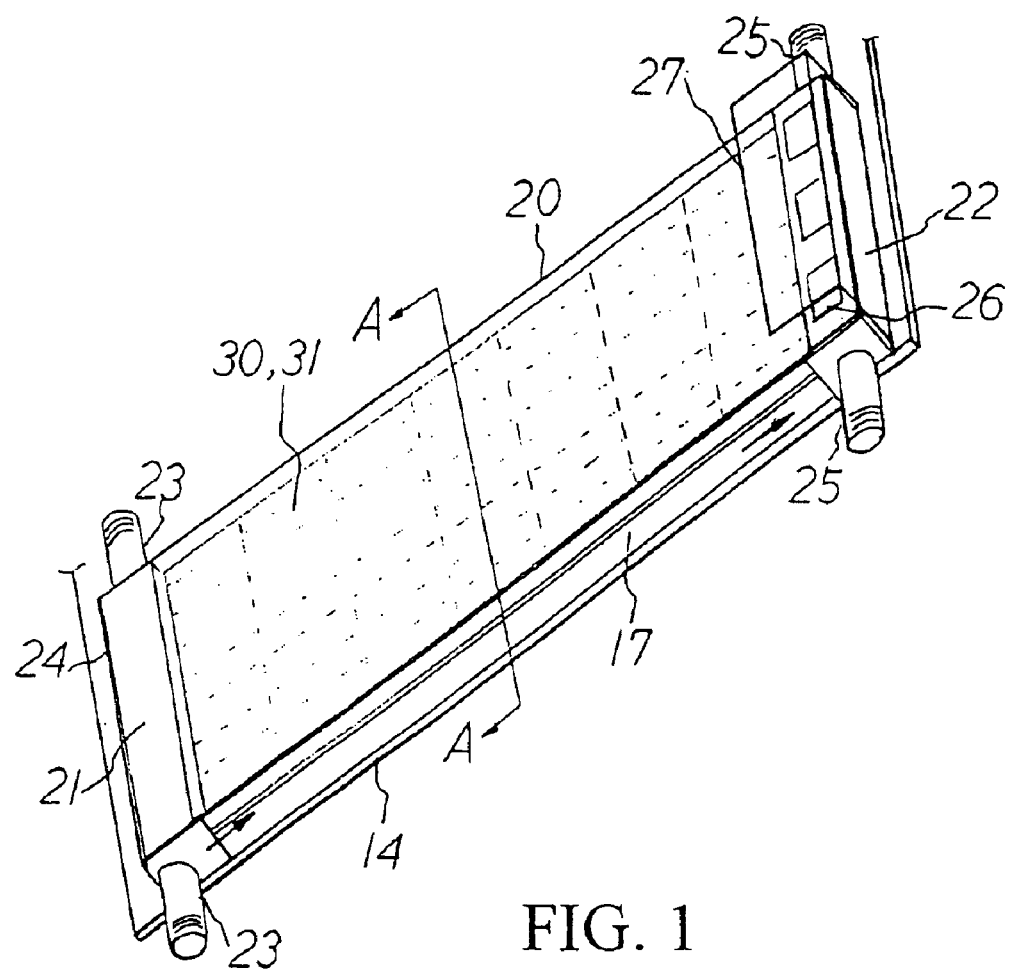
FIG. 1 is a schematic view showing a solar air conditioning system in accordance with the present invention.

FIG. 1 is a schematic view of a solar air conditioning system in accordance with the present invention. The air conditioning system includes a solar collector assembly (20), an inlet assembly (21), and an outlet assembly (22). The solar collector assembly (20) forms the paths for heating air and further comprises a heat-absorbing set (17), a transparent panel (30, 31) and a support base (14).

Figure 2A:
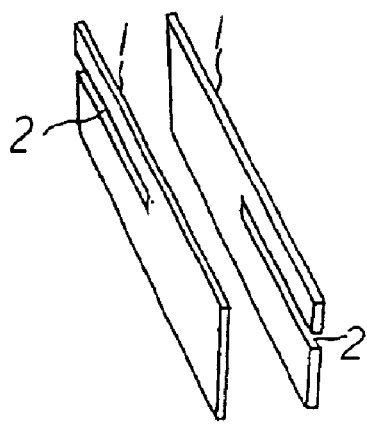
FIG. 2A is a perspective view showing support boards used in a solar air conditioning system in accordance with the present invention.
Figure 2B:
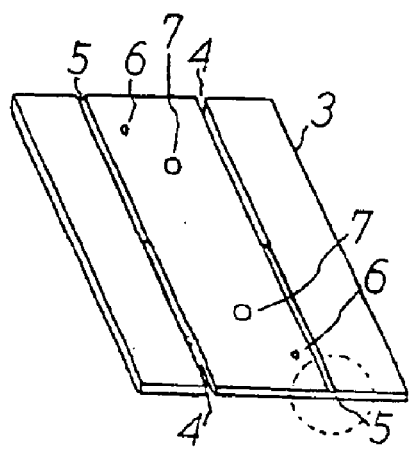
FIG. 2B is a perspective view showing a heat-absorbing plate used in a solar air conditioning system in accordance with the present invention.
Figure 2C:
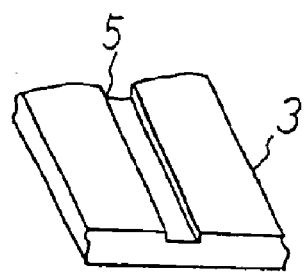
FIG. 2C is an enlarged view showing the area marked by the dotted lines illustrated in FIG. 2B.

The heat-absorbing set (17) includes several black modular heat-absorbing units (10). As shown in FIGS. 2A to 2C, a heat-absorbing unit (10) includes two pieces of support boards (1) and a piece of heat-absorbing plate (3). These boards and plate (1, 3) are thin and handy for displaying, packaging, storage, transportation and assembly.

An elongated groove (2) is formed on the support board (1). The heat-absorbing plate (3) is formed with several heat-absorbing plate fixing holes (6) and several transparent panel fixing holes (7). Also, there is a pair of parallel grooves formed on the heat-absorbing plate (3), each comprising an elongated groove (4) that penetrates the plate (3) and a positioning groove (5) that does not. The length of the positioning groove (5) is substantially the same as that of the elongated groove (2) formed on the support board (1).

Figure 3A:
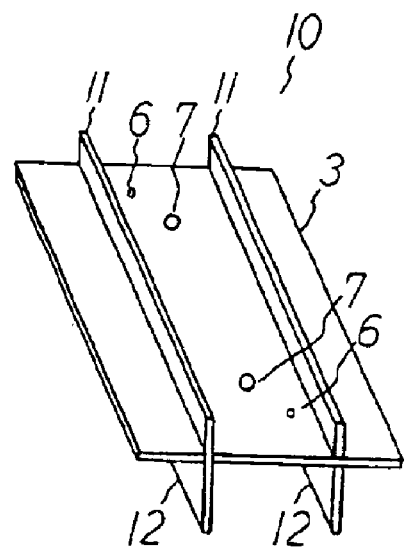
FIG. 3A is an assembly view showing a heat-absorbing unit used in a solar air conditioning system in accordance with the present invention.
Figure 3B:
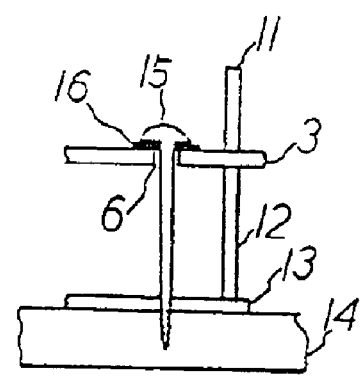
FIG. 3B is a side view showing the fixing of a heat-absorbing unit used in a solar air conditioning system in accordance with the present invention.

FIGS. 3A and 3B respectively illustrate the assembly view and the fixing of the heat-absorbing unit (10) of the solar air conditioning system. During the assembly, the elongated groove (2) formed on each support board (1) engages with the elongated groove (4) of the heat-absorbing plate (3) until the ends of the grooves (2, 4) abut against each other, which allows the edge of the elongated grooves (2) of the support board (1) to be clamped and further fixed by the positioning grooves (5) of the heat-absorbing plate (3). Because the two elongated grooves (4) of the heat-absorbing plate (3) can be formed on the same side or the opposite sides, the insertion direction of the support board (1) can be adjusted according to the direction of the two elongated grooves (4) formed on the heat-absorbing plate (3).

In addition, after the heat-absorbing unit (10) is assembled, the portions of support boards (1) above and below the heat-absorbing plate (3) can further be defined as upper support boards (11) and lower support boards (12), respectively.

The modular heat-absorbing unit (10) shown in FIG. 3A can be flexibly arranged according to the users' requirements and the characteristics of roofs. The present invention thus can be applied to a larger variety of buildings than a conventional solar collector assembly can.

FIG. 3B shows the fixing of the heat-absorbing unit (10), which is achieved by rotating screws (15) through the pre-determined holes (6) formed on the heat-absorbing plate (3) and into the roof or the fixed boards (14). Furthermore, a more solid fixing can be achieved by inserting washers (16) between the screw caps and the heat-absorbing plate (3).

Figure 4A:
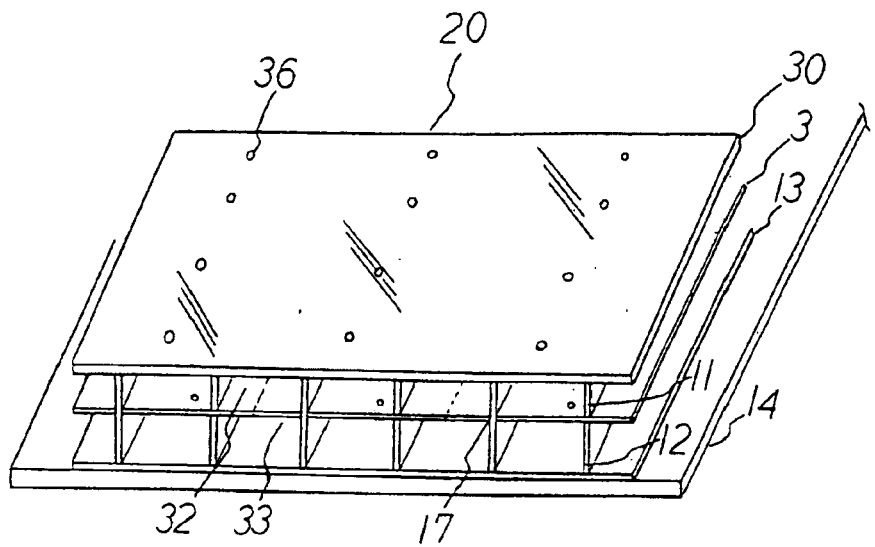
FIG. 4A is a perspective view taken from Section A—A in FIG. 1, wherein the solar collector assembly comprises a flat transparent panel.
Figure 4B:
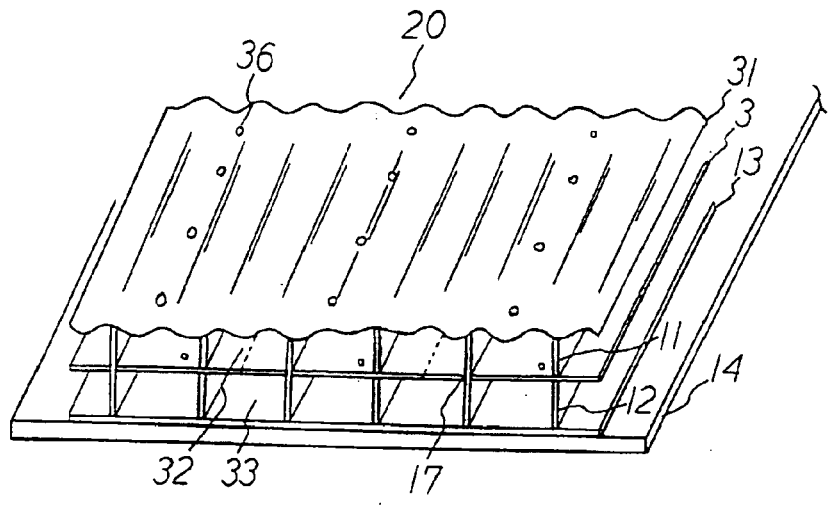
FIG. 4B is a perspective view taken from Section A—A in FIG. 1, wherein the solar collector assembly comprises a corrugated transparent panel.

Placing several modular heat-absorbing units (10) on the roof or the fixed boards (14) paved with heat-insulated layers (13) can construct an ideal solar heat-absorbing set (17). FIGS. 4A and 4B are perspective views taken from Section A—A in FIG. 1, showing sectional views of a solar collector assembly (20). In the embodiment shown in FIG. 4A, the panel for the solar collector assembly (20) is a transparent flat panel (30). In the embodiment shown in FIG. 4B, the panel for the solar collector assembly (20) is a transparent corrugated panel (31).

As shown in FIGS. 4A and 4B, multiple upper heat-absorbing channels (32) are formed between the panel (30, 31) and the heat-absorbing plates (3). Multiple lower heat-absorbing channels (33) are formed between the heat-absorbing plates (3) and the heat-insulated layer (13). In order to reduce possible heat loss from the transparent panel (30, 31), two approaches can be taken. The first approach is to close the entrances and exits of the upper heat-absorbing channels (32). The second approach is to reduce the height ratio of the upper support boards (11) to the lower support boards (12). Both approaches allow air to be heated mainly in the lower heat-absorbing channels (33). Therefore, though the present invention only has one layer of transparent panel (30, 31), since most air goes through the lower heat-absorbing channels (33), the system demonstrates the excellent heat insulation effect of double-glazing and improves the heating efficiency.

Figure 4C:
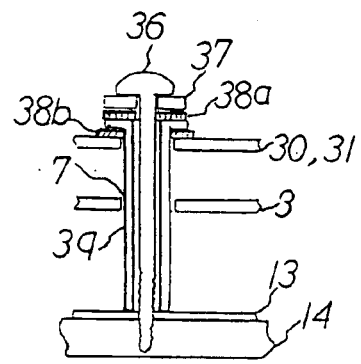
FIG. 4C is a schematic view showing the fixing of a transparent panel of a solar air conditioning system in accordance with the present invention.

FIG. 4C shows the fixing of a transparent panel (30, 31) of the solar collector assembly (20). In order to fix the transparent panel (30, 31) to the roof or the fixed boards (14) and protect the solar collector assembly (20) from the rain, it is necessary to first drill holes in the transparent panel (30, 31) along the axis of the fixing holes (7) in the heat-absorbing plates (3), and then insert bushings (39) with soft washers (38b) through the holes in the transparent panels (30, 31) and into the fixing holes (7) in the heat-absorbing plates (3) such that the end of the bushings (39) contact with the heat-insulated layer (13) or the fixed boards (14). Next, by inserting screws (36) equipped with hard washers (37) and soft washers (38a), through the bushings (39), and into the roof or the fixed boards (14) to lock the transparent panel (30, 31) onto the roof or the fixed boards (14), the rain will be prevented from leaking into the solar collector assembly (20).

Figure 5:
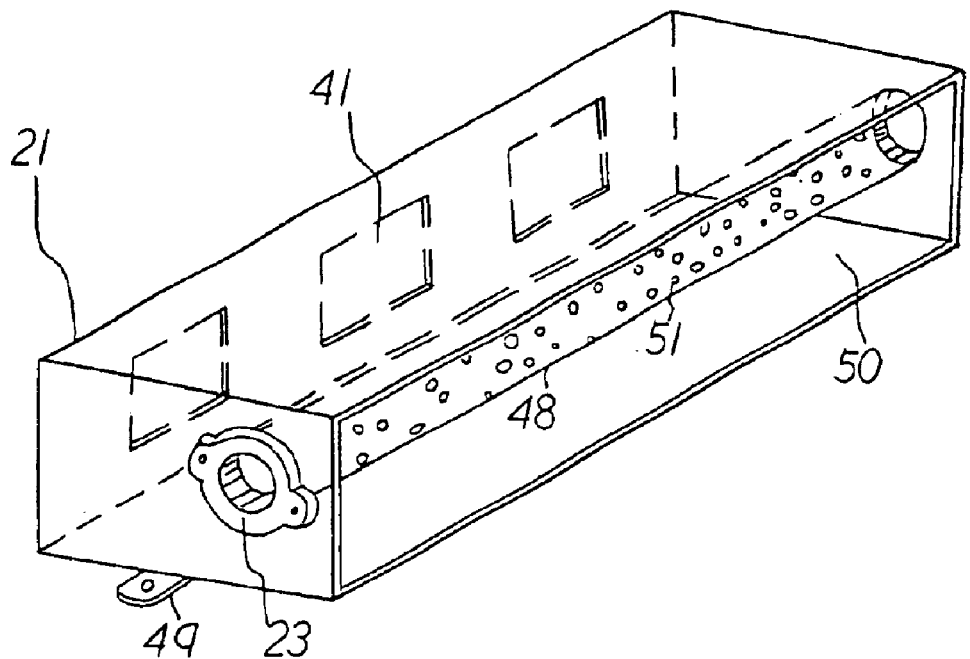
FIG. 5 is a schematic view showing an inlet assembly of a solar air conditioning system in accordance with the present invention.
Figure 6:
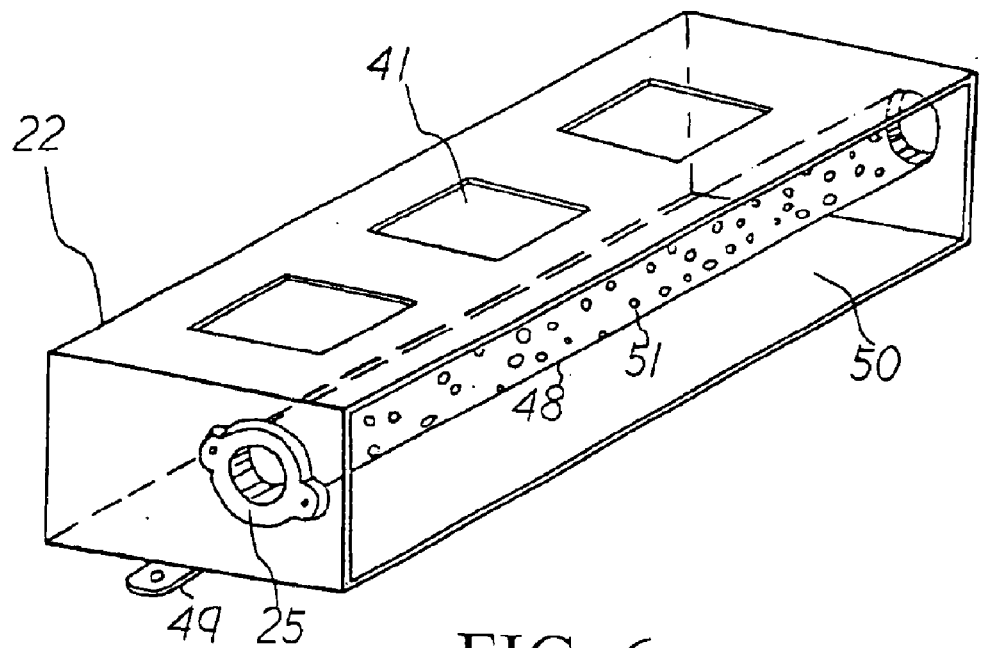
FIG. 6 is a schematic view showing an outlet assembly of a solar air conditioning system in accordance with the present invention.

FIGS. 5 and 6 are schematic views of the inlet assembly (21) and the outlet assembly (22) of the solar air conditioning system in accordance with the present invention. As shown in FIGS. 1, 5 and 6, the inlet assembly (21) and the outlet assembly (22) have structures for communicating to the heat-absorbing channels (32, 33) in the solar collector assembly (20).

As shown in FIGS. 1 and 5, the inlet assembly (21) has a blank side (50) facing the heat-absorbing channels (32, 33) in the solar collector assembly (20). Through this blank side (50), the inlet assembly (21) connects to the transparent panel (30, 31) on the solar collector assembly (20) and such a connection is sealed. The inlet assembly (21) itself is fixed to the roof or the fixed boards (14) by means of locks (49). On both sides of the inlet assembly (21) are joints (23) for connecting to the indoor exhaust pipes and the communications therebetween are controlled by conventional dampers (not shown). However, one of the joints (23) may be chosen to be used according to the direction of the indoor exhaust pipes, and the other one will be closed by a plug (not shown).

Two joints (23) for connecting to the indoor exhaust pipes are linked by an air distributor (48). The distributor (48) is uniformly formed with drilled holes (51) on the side facing the heat-absorbing channels (32, 33) of the solar collector assembly (20) to ensure that after air flows into the inlet assembly (21), it is uniformly distributed to heat-absorbing channels (32, 33) so that the overall efficiency of heat absorption can be increased. In order to reduce the air flow resistance, the total area of the drilled holes (51) is preferably twice as large as the cross-sectional area of the joints (23) connecting to the indoor exhaust pipes. The inlet assembly (21) further has an air inlet side (24) that communicates to paths leading to the outdoors. The air inlet side (24) is opposite to the heat-absorbing channels (32, 33). In addition, the air inlet side (24) is formed with several pre-set openings (41) for receiving several modular ventilation damper assemblies (40) by fixing the flanges (42) thereof to the rim of the pre-set openings (41) so as to control the opening and closing of the air inlet side (24). The sizes of the pre-set openings (41) on the air inlet side (24), as well as the number of the ventilation damper assemblies (40), are determined by the size of the solar collector assembly (20). The structure of the ventilation damper assembly (40) will be further described below in accordance with FIG. 7.

FIG. 6 is a schematic view showing the outlet assembly (22) of the solar air conditioning system in accordance with the present invention. As shown in FIGS. 1 and 6, the outlet assembly (22) has a blank side (50) facing the heat-absorbing channels (32, 33) in the solar collector assembly (20). Through this blank side (50), the outlet assembly (22) connects to the transparent panel (30, 31) on the solar collector assembly (20) and such a connection is sealed. The outlet assembly (22) itself is fixed to the roof or the fixed boards (14) by means of locks (49). On both sides of the outlet assembly (22) are joints (25) for connecting to the indoor inlet pipes and the communications therebetween are controlled by conventional dampers (not shown). Similar to the joints (23) of the inlet assembly (21), one of the joints (25) may be chosen to be used according to the direction of the indoor inlet pipes, and the other one will be closed by a plug (not shown).

Two joints (25) for connecting to the indoor inlet pipes are also linked by an air distributor (48). The distributor (48) is uniformly formed with drilled holes (51) on the side facing the heat-absorbing channels (32, 33) of the solar collector assembly (20) to ensure that air is uniformly distributed to the heat-absorbing channels (32, 33) so that the overall efficiency of heat absorption can be increased. The outlet assembly (22) further has an upward air exhaust side (26) that communicates to paths leading to the outdoors. In addition, the air exhaust side (26) is formed with several pre-set openings (41) for receiving several modular ventilation damper assemblies (40) by fixing the flanges (42) thereof to the rim of the pre-set openings (41) so as to control the opening and closing of the air exhaust side (26). The size of the pre-set opening (41) on the air exhaust side (26), as well as the number of the ventilation damper assemblies (40), are determined by the size of the solar collector assembly (20). Moreover, in order to prevent rain from getting into the outlet assembly (22), a transparent canopy (27) can be disposed above the air exhaust side (26).

As shown in FIGS. 5 and 6, the structure of the outlet assembly (22) is similar to that of the inlet assembly (21), except that: firstly, the ventilation damper assembly (40) of the outlet assembly (22) faces upwards; secondly, the outlet assembly (22) needs an additional rain-proof canopy (27) to prevent rain from leaking into the ventilation damper assembly (40); and thirdly, on both sides of the outlet assembly (22) are joints (25) for connecting to the indoor inlet pipes.

Figure 7A:
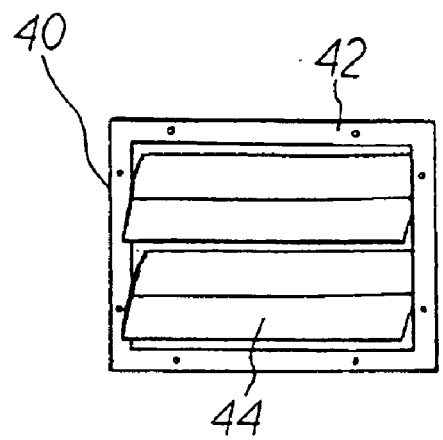
FIG. 7A is a schematic view showing a ventilation damper assembly installed in inlet and outlet assemblies used in a solar air conditioning system in accordance with the present invention.
Figure 7B:
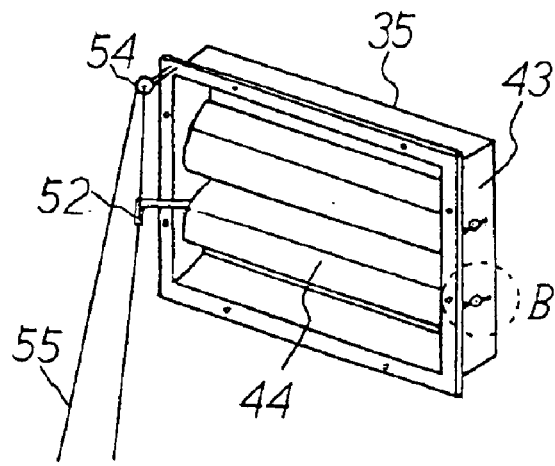
FIG. 7B is a schematic view showing the way of remotely controlling the ventilation damper assembly shown in FIG. 7A.
Figure 7C:
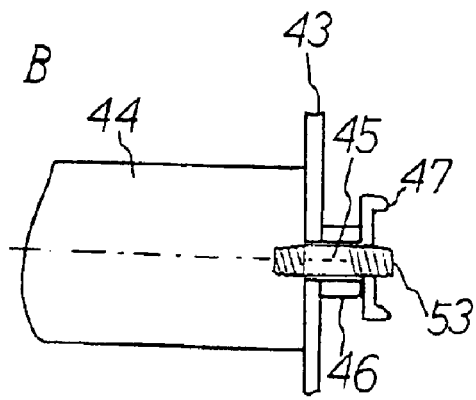
FIG. 7C is a partial sectional view of the ventilation damper assembly shown in FIG. 7A.

FIGS. 7A to 7C are schematic views of the ventilation damper assembly (40) used in the inlet assembly (21) and the outlet assembly (22) shown in FIG. 5 and FIG. 6. As shown in FIGS. 7A and 7B, the ventilation damper assembly (40) is disposed to the pre-set openings (41) of the inlet assembly (21) and the outlet assembly (22) by flanges (42) thereof.

As shown in FIG. 7B, the basic structure of the ventilation damper assembly (40) comprises multiple rectangular blades (44) which have a wing-shaped cross-sectional profile and are mounted on the parallel pivots (45). The pivots (45) are in turn supported on both sides of a rectangular outer frame (43) by means of shaft bearings (46).

The opening and closing of the ventilation damper assembly (40) is done with a connecting rod (not shown) that connects to the blades (44) so that the turning angle of each blade (44) is the same. A pulling rod (52) is further secured to a pivot (45) of one of the blades (44). By changing the position of the pulling rod (52), the blades (44) can be turned from a completely open position to a completely closed position, and the open state of the ventilation damper assembly (40) can be determined. As shown in FIG. 7C, to ensure that while in the completely closed position, the blades (44) have sufficient tightness with both sides of the outer frame (43), the outermost end of each pivot (45) is provided with a threaded section (53) which extends out of the shaft bearing (46). By adjustably engaging a locking nut (47) with the threaded section (53), the gap between an end of the blade (44) and a side of the outer frame (43) can be minimized such that air leakage can be reduced in the completely closed position. In addition, a screen (35) can be provided on the outer frame (43) of the ventilation damper assembly (40), facing the heat-absorbing channels (32, 33), so as to prevent dust and insects from entering the assembly (40). Moreover, since the present invention of the solar air conditioning system may be installed on roofs or high walls where most people cannot reach, a pulling rod (52) can be linked to a drive mechanism, such as a rope (55) linking with the pulling rod (52) and passing over a pulley (54), so that changing the blade (44) position can be achieved by operating the rope (55), as shown in FIG. 7B.

Based on the above structures, by respectively connecting the joint (23) of the inlet assembly (21) and the joint (25) of the outlet assembly (22) to the indoor exhaust pipe and the indoor inlet pipe, and switching and adjusting the opening and closing of the air inlet side (24) and air exhaust side (26) communicating to the paths leading to the outdoors, the best air conditioning effect can be achieved, which is explained as follows:

In summer and hot weather time, the communication between the joint (23) of the inlet assembly (21) and the indoor exhaust pipe is opened and the ventilation damper assemblies (40) arranged on the air inlet side (24) of the inlet assembly (21) are closed. Further, the communication between the joint (25) of the outlet assembly (22) and the indoor inlet pipe is closed and the ventilation damper assemblies (40) arranged on the air exhaust side (26) of the outlet assembly (22) are opened. Accordingly, the solar collector assembly (20) heats the air flowing from the indoor exhaust pipe through the joint (23) and the heated air expels the indoor air out of the buildings due to the chimney effect caused by the thermal buoyancy generated by the heated air. At this moment, if an inlet gate which introduces the air from the outdoors is located at a cold position or the air introduced from the outdoors is cooled, the present solar air conditioning system can achieve the effect of air conditioning with cooled air circulation.

In winter and cold weather time, the communication between the joint (23) of the inlet assembly (21) and the indoor exhaust pipe is opened and the ventilation damper assemblies (40) arranged on the air inlet side (24) of the inlet assembly (21) are closed. Further, the communication between the joint (25) of the outlet assembly (22) and the indoor inlet pipe is opened and the ventilation damper assemblies (40) arranged on the air exhaust side (26) of the outlet assembly (22) are closed. Accordingly, the solar collector assembly (20) heats the air flowing from the indoor exhaust pipe through the joint (23) and the heated air flows into the indoor inlet pipe through the joint (25) so as to heat the indoor space, which can be speeded up by a fan or a blower associated with the indoor inlet pipe. However, if fresh air is to be introduced from the outdoors and heated together with the air from the indoor exhaust pipe, so as to save energy and keep the indoor air fresh, the communication between the joint (23) of the inlet assembly (21) and the indoor exhaust pipe is opened and the ventilation damper assemblies (40) arranged on the air inlet side (24) of the inlet assembly (21) should be opened to a desired position.

The present solar air conditioning system can be installed to work with a conventional solar hot water supply system for all seasons, which is achieved by placing heat-absorbing water pipes of the hot water system into the upper heat-absorbing channels (32) of the present invention, and then sending the heated water back to the water circulation circuit (not shown) made of the heat storage tank. The circulated air is heated primarily at the lower heat-absorbing channels (33) of the present invention to reduce heat loss from the transparent panels (30, 31).

Figure 8A:
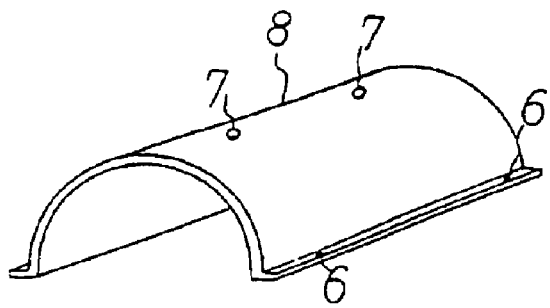
FIG. 8A is a perspective view showing an alternative embodiment of a heat-absorbing unit used in a solar air conditioning system in accordance with the present invention.
Figure 8B:
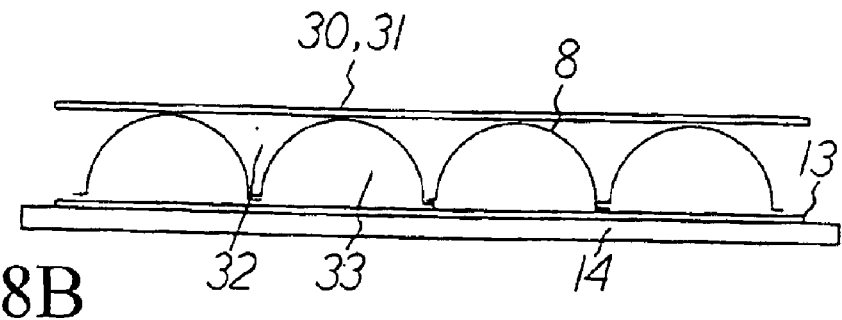
FIG. 8B is a sectional view of the heat-absorbing unit in FIG. 8A, taken along Section A—A in FIG. 1.

FIGS. 8A and 8B respectively show a perspective view showing an alternative embodiment of a heat-absorbing unit (8) used in a solar air conditioning system in accordance with the present invention and a sectional view of the heat-absorbing unit in FIG. 8A, taken along Section A—A in FIG. 1. As shown in FIG. 8A, the heat-absorbing unit (8) is made of a thin metal plate with the surface thereof painted or coated black, allowing it to serve as the heat-absorbing plate (3). The heat-absorbing unit (8) is partially in an arc or reverse U shape and the two sides of the unit (8) are webs for attaching the unit (8) onto the fixed board (14) under the solar collector assembly (20). The flat webs are formed with the heat-absorbing plate fixing holes (6). The top of the heat-absorbing unit (8) is formed with the transparent panel fixing holes (7). The way of fixing the transparent panels (30, 31) is similar to that shown in FIG. 4C. Further, as shown in FIG. 8B, multiple heat-absorbing units (8) have their two flat webs overlapping those of the neighboring units (8) with the heat-absorbing plate fixing holes (6) aligned. The heat-absorbing units (8) are then firmly fixed to the fixed boards (14) by inserting screws through the holes (6) and into the fixed boards (14), and form several fluid cross sections in the heat-absorbing set (17). Together with the transparent panels (30, 31) and the fixed board (14), the heat-absorbing set (17) forms smaller upper heat-absorbing channels (32) and larger lower heat-absorbing channels (33) in the solar collector assembly (20). The lower heat-absorbing channels (33) benefit from the heat-insulated effect as double-glazing, and a high efficiency of heat absorption.

Figure 9A:
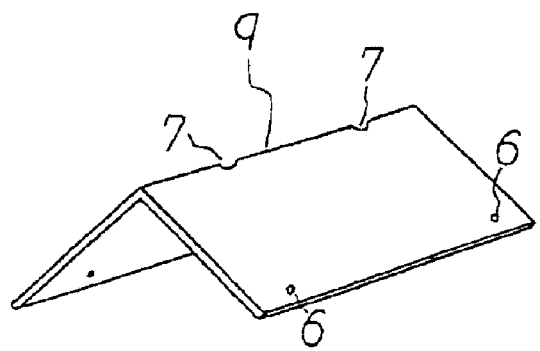
FIG. 9A is a perspective view showing a further embodiment of a heat-absorbing unit used in a solar air conditioning system in accordance with the present invention.
Figure 9B:
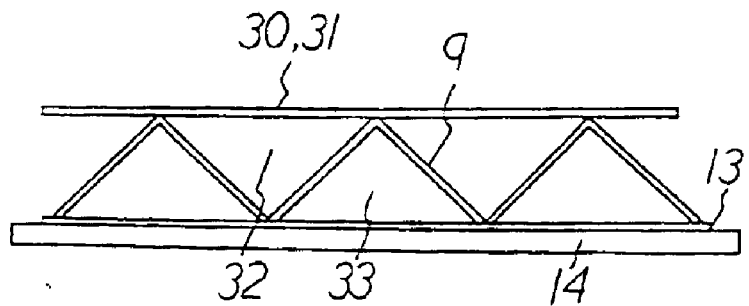
FIG. 9B is a sectional view of the heat-absorbing unit in FIG. 9A, taken along Section A—A in FIG. 1.

FIGS. 9A and 9B respectively show a perspective view showing a further embodiment of a heat-absorbing unit (9) used in a solar air conditioning system in accordance with the present invention and a sectional view of the heat-absorbing unit in FIG. 9A, taken along Section A—A in FIG. 1. As shown in FIG. 9A, the heat-absorbing unit (9) is made of an angled thin metal plate with the surface thereof painted or coated black, allowing it to serve as the heat-absorbing plate (3). Two sides of the unit (9) for attaching the unit (9) onto the fixed board (14) under the solar collector assembly (20), are formed with the heat-absorbing plate fixing holes (6). The top of the heat-absorbing unit (9) is formed with the transparent panel fixing holes (7). The way of fixing the transparent panels (30, 31) is similar to that shown in FIG. 4C. Further, as shown in FIG. 9B, multiple heat-absorbing units (9) are firmly fixed to the fixed boards (14) by inserting screws through the holes (6) and into the fixed boards (14), and form several fluid cross sections in the heat-absorbing set (17). Together with the transparent panels (30, 31) and the fixed board (14), the heat-absorbing set (17) forms smaller upper heat-absorbing channels (32) and larger lower heat-absorbing channels (33) in the solar collector assembly (20). The lower heat-absorbing channels (33) benefit from the heat-insulated effect as double-glazing, and a high efficiency of heat absorption.

The solar air conditioning system in accordance with the present invention has many features that are superior to those of conventional solar air conditioning systems. Adapting the concept of a modular design, the present invention provides buildings with a greater compatibility in application. Moreover, the present invention provides users with more selection and freedom in assembly. The present invention can be installed to all kinds of buildings, including ones that are under construction or currently existing ones. It can be installed horizontally or vertically attached to walls. Furthermore, it can be installed at an angle. The present invention can also provide excellent heat insulation and protection to the buildings.

The heat-absorbing units used in the present invention can be flexibly expanded as desired to the most optimal absorption surface areas to fully receive and collect energy. Therefore, the present invention does not need a fixed outer frame insulation chamber like the one used in the conventional design. The present invention also needs no special consideration for the heat efficiency of each individual unit, as conventional models do. One special feature of the present invention is that although it only has one layer of transparent panel in its structure, because most air goes through the lower heat-absorbing channels, the system has the excellent insulation effect of a double-glazed system and a very high heat-absorbing efficiency.

Compared with the conventional model, the present invention has a lighter and thinner structure and appearance, and thus it does not cause any burden to the buildings. The commercially available flat transparent panels and corrugated transparent panels can maintain the harmony and aesthetics of the existing buildings. At the same time, the transparent panels can provide protection to the roof while serving as the double-glazed transparent panels for the solar collector assembly. Further, since the installation of the transparent panels does not have to be glazed into the outer frame of the heat-insulated chamber as one must in the conventional model, the thermal expansion coefficient of materials used in the present invention will not cause thermal stress problems related to deformation or cracking.

The present solar air conditioning system is designed in a modular concept. It can greatly reduce costs because the heat-absorbing units are made of thin boards and plates, and are much simpler compared to the conventional system with a whole-unit design. The present system not only saves costs in packaging but also requires less room for display and storage to make channel marketing much easier. It is very easy to install and maintain such a system. Moreover, users can try to install or assemble the system by themselves.

The above descriptions have clearly illustrated the important features, operational methods and applications of the present invention. Although the invention has been described with reference to the preferred embodiments, it will be obvious to persons skilled in the art that various changes and modifications may be made without departing from the scope of the invention as recited in the claims.

| Sequence Listing | |
|---|---|
| 1 | support board |
| 2 | elongated groove |
| 3 | heat-absorbing plate |
| 4 | elongated groove |
| 5 | positioning groove |
| 6 | heat-absorbing plate fixing hole |
| 7 | transparent panel fixing hole |
| 8 | heat-absorbing unit |
| 9 | heat-absorbing unit |
| 10 | heat-absorbing unit |
| 11 | upper support board |
| 12 | lower support board |
| 13 | heat-insulated layer |
| 14 | support base (roof or fixed boards) |
| 15 | screw |
| 16 | washer |
| 17 | heat-absorbing set |
| 20 | solar collector assembly |
| 21 | inlet assembly |
| 22 | outlet assembly |
| 23 | joint connected to the indoor exhaust pipe |
| 24 | air inlet side |
| 25 | joint connecting to the indoor inlet pipe |
| 26 | air exhaust side |
| 27 | rain-proof canopy |
| 30 | flat transparent panel |
| 31 | corrugated transparent panel |
| 32 | upper heat-absorbing channel |
| 33 | lower heat-absorbing channel |
| 35 | screen |
| 36 | screw |
| 37 | hard washer |
| 38a | soft washer |
| 38b | soft washer |
| 39 | bushing |
| 40 | ventilation damper assembly |
| 41 | pre-set opening |
| 42 | flange |
| 43 | outer frame |

-continued

Sequence Listing

| 44 | blade |
| 45 | pivot |
| 46 | shaft bearing |
| 47 | locking nut |
| 48 | air distributor |
| 49 | lock |
| 50 | blank side |
| 51 | drilled hole |
| 52 | pulling rod |
| 53 | threaded section |
| 54 | pulley |
| 55 | rope |

What is claimed is:

1. A solar air conditioning system, comprising:
a solar collector assembly as an air heating path, having:
   a heat-absorbing set including several modular heat-absorbing units to form multiple heat-absorbing channels for absorbing solar energy;
   a transparent panel installed above the beat-absorbing set to absorb solar energy and protect the heat-absorbing set, and
   a support base installed beneath the heat-absorbing set to support and fix the solar collector assembly;
   an inlet assembly installed at an entrance of the solar collector assembly and communicating with the heat-absorbing channels of the multiple heat-absorbing set; and
   an outlet assembly installed at an exit of the solar collector assembly and communicating with the multiple heat-absorbing channels of the heat-absorbing set;
wherein
said modular heat-absorbing units comprise a plurality of separate heat-absorbing plates which are detachably assembled to the support base to form upper heat-absorbing channels between the transparent panel and the heat-absorbing plates, and lower heat-absorbing channels between the heat-absorbing plates and the support base, wherein the upper and lower heat-absorbing channels are located above and below the heat-absorbing plates, respectively, the lower heat-absorbing channels forming air flow paths allowing air passing therethrough; and the upper heat-absorbing channels forming a substantially closed space in which air is substantially stagnant.

2. A solar air conditioning system according to claim 1, wherein the modular heat-absorbing unit further comprises two pieces of support board, the support board being formed with an elongated groove, the heat-absorbing plate being formed with grooves for engaging with the groove formed on each support board, whereby the heat-absorbing plate and the support boards form upper and lower heat-absorbing channels respectively located above and below the heat-absorbing plate.

3. A solar air conditioning system according to claim 1, wherein the modular heat-absorbing unit is made of a heat-absorbing plate in the shape of an arc or reverse U plate to form upper and lower heat-absorbing channels respectively located above and below the heat-absorbing plate.

4. A solar air conditioning system according to claim 1, wherein the modular heat-absorbing unit is made of a heat-absorbing plate in the shape of an angled plate to form upper and lower heat-absorbing channels respectively located above and below the heat-absorbing plate.

5. A solar air conditioning system according to claim 2, wherein the entrances and exits of the upper heat-absorbing channels formed in the heat-absorbing set are sealed to reduce heat loss from the transparent panel.

6. A solar air conditioning system according to claim 3, wherein the entrances and exits of the upper heat-absorbing channels formed in the heat-absorbing set are sealed to reduce heat loss from the transparent panel.

7. A solar air conditioning system according to claim 4, wherein the entrances and exits of the upper heat-absorbing channels formed in the heat-absorbing set are sealed to reduce heat loss from the transparent panel.

8. A solar air conditioning system according to claim 1, wherein the support base of the heat-absorbing set is a roof.

9. A solar air conditioning system according to claim 1, wherein the support base of the heat-absorbing set is a fixed board.

10. A solar air conditioning system according to claim 1, wherein the heat-absorbing set further comprises a heat-insulated layer installed beneath the lower heat-absorbing channels.

11. A solar air conditioning system according to claim 1, wherein the heat-absorbing unit has a black surface to increase the efficiency for collecting solar energy.

12. A solar air conditioning system according to claim 1, wherein the inlet assembly includes:
   an air inlet side formed with at least one pre-set opening for communicating to the outdoors;
   at least one modular ventilation damper assembly installed at the pre-set opening for opening and closing the air inlet side; and
   at least one joint connecting to an indoor exhaust pipe.

13. A solar air conditioning system according to claim 1, wherein the outlet assembly includes:
   an air exhaust side formed with at least one pre-set opening for communicating to the outdoors;
   at least one modular ventilation damper assembly installed at the pre-set opening for opening and closing the air exhaust side; and
   at least one joint connecting to an indoor inlet pipe.

14. A solar air conditioning system according to claim 1, wherein the transparent panel is a flat plate.

15. A solar air conditioning system according to claim 1, wherein the transparent panel is a corrugated plate.

16. A solar air conditioning system according to claim 12, wherein the inlet assembly further comprises an air distributor connected to the joint connecting to the indoor exhaust pipe, the distributor having uniformly distributed drilled holes on the side facing the heat-absorbing channels.

17. A solar air conditioning system according to claim 13, wherein the outlet assembly further comprises an air distributor connected to the joint connecting to the indoor inlet pipe, the distributor having uniformly distributed drilled holes on the side facing the heat-absorbing channels.

18. A solar air conditioning system according to claim 13, wherein the outlet assembly further has a rain-proof canopy to prevent rain from entering into the air exhaust side.

19. A solar air conditioning system according to claim 12, wherein the modular ventilation damper assembly is made of several rectangular blades with a wing-shaped cross-sectional profile, the blades being installed on parallel pivots which in turn are supported on both sides of a rectangular outer frame by means of shaft bearings, the outermost end of each pivot being provided with a threaded section which extends out of the shaft bearing, a pulling rod being further secured to the pivot of one of the blades, whereby by changing the position of the pulling rod, the blades can be turned from a completely open position to a completely closed position, and by adjustably engaging a locking nut with the threaded section, the air leakage can be minimized in the completely closed position.

20. A solar air conditioning system according to claim 13, wherein the modular ventilation damper assembly is made of several rectangular blades with a wing-shaped cross-sectional profile, the blades being installed on parallel pivots which in turn are supported on both sides of a rectangular outer frame by means of shaft bearings, the outermost end of each pivot being provided with a threaded section which extends out of the shaft bearing, a pulling rod being further secured to the pivot of one of the blades, whereby by changing the position of the pulling rod, the blades can be turned from a completely open position to a completely closed position, and by adjustably engaging a locking nut with the threaded section, the air leakage can be minimized in the completely closed position.

* * * * *